(12) United States Patent
Jin

(10) Patent No.: US 6,296,699 B1
(45) Date of Patent: Oct. 2, 2001

(54) INORGANIC BINDERS EMPLOYING WASTE GLASS

(76) Inventor: Weihua Jin, 90 La Salle St., Apt. 15D, New York, NY (US) 10027

(*) Notice: Subject to any disclaimer, the term of this patent is extended or adjusted under 35 U.S.C. 154(b) by 0 days.

(21) Appl. No.: 09/493,025

(22) Filed: Jan. 27, 2000

Related U.S. Application Data

(60) Provisional application No. 60/117,593, filed on Jan. 27, 1999, and provisional application No. 60/117,594, filed on Jan. 27, 1999.

(51) Int. Cl.⁷ .................................................. C04B 14/22
(52) U.S. Cl. .................. 106/814; 106/286.1; 106/286.2; 106/286.7; 106/600; 106/606; 106/638; 106/691; 106/692; 106/716; 264/333
(58) Field of Search .................................. 106/600, 606, 106/638, 692, 814, 691, 716, 286.1, 286.2, 286.7; 264/333

(56) References Cited

U.S. PATENT DOCUMENTS

| | | | |
|---|---|---|---|
| 3,498,802 | 3/1970 | Bickford | 501/54 |
| 3,720,527 | 3/1973 | Farrauto et al. | 106/629 |
| 3,743,525 | 7/1973 | Farrauto et al. | 106/612 |
| 3,963,503 | 6/1976 | Mackenzie | 501/39 |
| 4,116,703 | 9/1978 | Stempin et al. | 106/601 |
| 4,440,576 | 4/1984 | Flannery et al. | 106/814 |
| 4,997,484 | 3/1991 | Gravitt et al. | 106/708 |
| 5,243,715 | 9/1993 | Barmak | 4/558 |
| 5,364,672 | 11/1994 | Schultze-Kraft | 428/15 |
| 5,403,664 | 4/1995 | Kurahashi et al. | 428/426 |
| 5,520,725 * | 5/1996 | Kato et al. | 106/35 |
| 5,565,028 | 10/1996 | Roy et al. | 106/705 |
| 5,601,643 | 2/1997 | Silverstrim et al. | 106/624 |
| 5,691,282 * | 11/1997 | Periard et al. | 508/113 |
| 5,698,026 * | 12/1997 | Boaz | 106/600 |
| 5,720,835 | 2/1998 | Lingart et al. | 156/89 |
| 5,803,960 | 9/1998 | Baxter | 106/711 |
| 5,810,921 | 9/1998 | Baxter et al. | 106/711 |
| 5,900,202 | 5/1999 | Lingart et al. | 264/113 |

FOREIGN PATENT DOCUMENTS

| | | | |
|---|---|---|---|
| 52-117847 | * | 10/1977 | (JP). |
| 55-9674 | * | 1/1980 | (JP). |
| 57-92546 | * | 6/1982 | (JP). |
| 58-140356 | * | 8/1983 | (JP). |
| 58-167720 | * | 10/1983 | (JP). |
| 3-112825 | * | 5/1991 | (JP). |
| 7-26166 | * | 1/1995 | (JP). |

OTHER PUBLICATIONS

Derwent Abstract No. 1982–92232E, abstract of Soviet Union Patent Specification No. 891756 (Dec. 1981).*
Derwent Abstract No. 1985–153207, abstract of German Patent Specification No. 219175 (Feb. 1985).*
C. Meyer et al., "Use of recycled Glass and Fly Ash For Pre-cast Concrete", New York State Energy Research and Development Authority, Final Report 98–18, Oct. 1998.
C. Meyer et al., "Use of recycled Glass for Concrete Masonry Blocks", New York State Energy Research and Development Authority, Final Report 97–15, Nov. 1997.

* cited by examiner

Primary Examiner—Anthony Green
(74) Attorney, Agent, or Firm—Frommer Lawrence & Haug LLP; George L. Pan

(57) ABSTRACT

The present invention relates to a binder composition comprising a glass powder with a particle size of at least less than 0.15 mm and an alkali activator containing at least one alkali metal and at least one silicate. Preferably, a sodium silicate with a $SiO_2:Na_2O$ weight ratio between about 1.6:1 to about 2.0:1. Mixed with water, the binder composition can be cured at ambient temperature, but rapidly yields a very high strength at an elevated temperature between about 40° C. to about 120° C. Preferably, between about 70° C. to about 90° C. The invention further provides a method of making artificial stone using glass as a sole binder and aggregate.

25 Claims, No Drawings

INORGANIC BINDERS EMPLOYING WASTE GLASS

CROSS REFERENCE TO RELATED APPLICATIONS

This application claims priority to provisional application Ser. No. 60/117,593, filed Jan. 27, 1999, entitled "Glass Binder Composition and Artificial Decorative Stone Made Solely From Waste Glass" incorporated herein by reference, together with any documents therein cited and any documents cited or referenced in therein cited documents. Reference is also made to U.S. Provisional Patent Application Ser. No.: 60/117,594, filed Jan. 27, 1999. entitled "ASR Free Compositions for Incorporation of Waste Glass and Artificial Decorative Stone Made Therewith" incorporated herein by reference, together with any documents therein cited and any documents cited or referenced in therein cited documents. All documents cited herein and all documents cited or referenced in herein cited documents are hereby incorporated herein by reference.

BACKGROUND OF THE INVENTION

1. Field of the Invention

This invention relates generally to inorganic binders, specifically to such inorganic binders which employ glass, preferably waste glass.

2. Description of the Related Art

Waste glass poses serious problems for municipalities worldwide, since glass is not biodegradable and only a small fraction of these waste glass can be reused by the primary market namely, the bottling and container industry.

Use of waste glass in a coarsely divided form, or as aggregate, in concrete has been attempted in the past. The main challenge, however, is to avoid a detrimental chemical reaction between the cement and glass aggregate, termed Alkali-Silica Reaction (hereinafter "ASR"), which causes cracking and degradation of concrete containing glass aggregate. For example, U.S. Pat. No. 5,810,921 to Baxter et al. ("the Baxter '921 patent") provides a glass formula comprising chromium for incorporation in glass-concrete compositions that does not undergo ASR. Still, U.S. Pat. No. 5,803,960 to Baxter ("the Baxter '960 patent") further provides a glass formulation with lithium in its glass-concrete composition to avoid ASR.

Attempts have also been made to use waste glass in a finely divided form, or as powder, in concrete. Waste glass powder has been shown to exhibit some degree of pozzolanic property and be able to partially replace Portland cement in concrete. For example, J. F. Archibald et al., "Ground Waste Glass as a Pozzolanic Consolidation Agent for Mine Backfill", CIM Bulletin, Vol. 88, pp.80–87, 1995, provides that up to 20% of Portland cement can be substituted by ground waste glass without substantial loss of strength in the final product. However, the pozzolanic reactivity of waste glass powder has proven to be extremely low. It does not readily react with lime, nor does it bear any binding ability in itself. Therefore, a need exists to impart self-binding property to glass, preferably waste glass.

Waste glass includes post-consumer glass articles such as beverage bottles, window glass, and any and all other glass containers. The general chemical composition of a glass has a general formula of $Na_2O$—$CaO$—$SiO_2$, commonly known as soda-lime glass. Specifically, glass comprises, in weight percentage, about 13.6% to 14.4% $Na_2O$, 10.7% to 12.2% $CaO$, and 71.3% to 73.5% $SiO_2$. A glass containing this chemical formula tends not to exhibit any cementitious or hydraulic property. To make a glass cementitious, i.e., self-binding upon adding water as hydraulic cement does, its chemical composition has to be specially formulated. For example, U.S. Pat. No. 3,498,802 to Bickford et al ("Bickford") provides a glass cement which comprises, in weight percentage of about 80% to 94% $SiO_2$ and 6% to 20% $Na_2O$ and/or $K_2O$ which hardens at a temperature of 100°–200° C. U.S. Pat. No. 3,720,527 to Farrauto et al ("the Farrauto '527 patent") provides a hydraulic glass cement comprising, in weight percentage, about 15% to 85% $Na_2O$ and/or $K_2O$, 10% to 80% $SiO_2$, and 3% to 20% $P_2O_5$. U.S. Pat. No. 3,743,525 to Farrauto et al ("the Farrauto '525 patent") provides a hydraulic glass cement which comprises, in weight percentage, about 20% to 80% $SiO_2$, 5% to 40% $Na_2O$ and/or $K_2O$, 5% to 70% RO, wherein RO consists of 0% to 30% $MgO$, 0% to 50% $CaO$, 0% to 70% $SrO$, and 0% to 35% $BaO$, and 5% to 15% $NaH_2PO_4$ and/or $KH_2PO_4$. U.S. Pat. No. 4,440,576 to Flannery et al ("Flannery") provides a hydraulic glass cement comprising, in terms of mole percentage on the oxide basis, about 60% to 76% $SiO_2$, 15% to 30% $K_2O$, and 2% to 15% total of at least one metal oxide selected from the group of 0% to 10% $Al_2O_3$, 0% to 5% $TiO_2$, 0% to 5% $MoO_3$ and 0% to 5% $WO_3$. The glass powder may also contain a phosphate component. Unfortunately, waste glass has chemical composition dissimilar to those of prior art hydraulic glass cements and thus does not harden readily with water. Since the chemical composition of glass is set, it would require re-melting of the glass and adding other minerals in the melt if the prior art compositions were to be achieved. Of course, this high-temperature glass melting process is energy-intensive and expensive. Hence, it is highly desirable for glass having a self-binding property yet not requiring a re-melting process to change its chemical composition.

Conventional pozzolanic materials or pozzolans include natural pozzolans such as volcanic tuffs and calcined clays and some industrial by-products such as fly ash and granulated blast furnace slag. These materials exhibit various degrees of pozzolanic reactivity. Some of them such as granulated furnace slag and Class C fly ash are highly pozzolanic and posses some cementitious property. Their wide use as a partial replacement for cement represents its versatile applicability. Attempts were made to increase the cementitious property of pozzolanic materials. Activation is a commonly known method. Activation is achieved either chemically by adding to the base pozzolanic material various alkali activators, or thermally by curing base pozzolanic material and activator mixture at elevated temperatures. For example, U.S. Pat. No. 4,997,484 to Gravitt et al ("Gravitt") provides a cement comprising Class C fly ash, 0.4% to 4.2% of an alkali metal activator, preferably potassium hydroxide, and 0.6% to 5% citric acid. U.S. Pat. No. 5,565,028 to Roy et al ("Roy") relates to cement comprising Class C fly ash and solutions of hydroxides of lithium, sodium, and potassium having a pH of about 14.69 or higher. U.S. Pat. No. 5,601,643 to Silverstrim et al ("Silverstrim") relates to a cementitious binder mixture comprising Class F fly ash and an alkali metal or alkaline earth metal silicate, which rapidly yields high strength when cured under elevated temperature. Unfortunately, non of these references teaches or suggests whether the method of activation is applicable to glass in general, nor does it teach how to activate glass. Glass differs from fly ash and granulated blast furnace slag like pozzolanic materials chemically, and has a different mineralogical composition and physical structure, thus, an effective method remains to be sought for glass having self-binding property and for rapid setting and high strength waste glass binders.

Other examples relating to methods of making glass products are further described below:

U.S. Pat. No. : 3,963,503 issued to Mackenzie ("Mackenzie") relates to an improved method of making glass products comprising mixing particulate used-container glass with a selected treating agent to form a unique glass mix. The used-container glass has a pre-selected approximate concentration range of foreign inclusions and an average reflectance of about 5% to about 95%. The mixture is heated to a temperature and pressure above the sintering and softening point of the glass, but below its melting point and within a range sufficient to activate the treating agent to either foam or fill the glass. In the latter case, increased pressure is applied to form the glass into a hard-pressed product, such as a tile appearance. In the former case, foamed glass of distinctive appearance is produced. The used-container glass includes a plurality of particles of various colors and the pressed product may have oxide pigments embedded in the surfaces thereof. The treating agent can be dolomite or other suitable treating agent.

U.S. Pat. No. : 4,116,703 issued to Stempin et al. ("Stempin") disclose composite foamable cement. Stempin relates to an inorganic cement mixture capable of being thermally foamed in situ, consists essentially by weight of 8–20% of crystalline hydraulic cement, 22–35% of a hydraulic cement in the form of a glass powder, and 45–70% quaternary ammonium silicate solution. The mixture can be set as a cement and thermally foamed to unite two bodies and serve as a spacer and a support to maintain them in spaced relation.

U.S. Pat. No. : 5,720,835 issued to Lingart et al. ("Lingart '835 Patent") relates to a decorative construction material and methods of its production. A decorative construction material such as a glass tile is produced from recycled glass granulate, and exhibits a smooth, external surface substantially free from defects on one side of the tile. One or two layer tiles may also be produced according to Lingart's '835 patent. A binder, together with a control of the maximum temperature and temperature gradient in the layers, if applicable, is used during manufacture to ensure a substantially flawless outer surface.

U.S. Pat. No. : 5,803,960 issued to Baxter ("Baxter '960 Patent") relates to a glass formula for avoiding ASR. Baxter relates generally to a glass formula for incorporating glass/concrete compositions. The glass contains lithium. Alkali-Silica Reaction is avoided in the glass/concrete compositions.

U.S. Pat. No. : 5,810,921 issued to Baxter ("Baxter '921 Patent"). Baxter uses a waste glass in concrete. The present invention relates generally to a glass formula for incorporation of glass-concrete compositions. The glass contains chromium. A detrimental reaction between the cement and the chromium glass and/or a reactive aggregate glass is suppressed in the set glass-concrete compositions.

U.S. Pat. No. : 5,900,202 issued to Lingart et al. ("Lingart '202 Patent") relates to a method of making glass silicate tiles. The method according to Lingart '202 patent includes making glass-silicate tiles by pouring an input raw material containing glass granulate into a heat-proof mold, wetting the input raw material and making an initial blank thereby, heat treating of the blank by gradual heating and by gradual cooling by stages with holding period between the stages wherein a first heating stage is performed predominantly by heating a bottom side of the blank with higher speed of heating of a lowering layer than of an upper layer of the blank to accelerate gases to release the blank through the upper layer up to reach of the temperature of beginning of glass granulate sintering ($T_f$) in the lower layer, and the temperature not exceeding a glass granulate transformation temperature ($T_g$) in the upper layer, a first holding period at these condition to expel generated gases, and heating the upper layer.

In view of the foregoing, there is a long felt need to device a composition and a method for glass that has a self-binding property which does not require a high temperature and high energy re-melting process and is capable of achieving high strength in a substantially shorter time than is known in the art.

SUMMARY AND OBJECT OF THE INVENTION

Objects of the present invention may include at least one of: to provide waste glass binders which have self-binding ability.

The invention additionally provide a glass binder that does not require a high temperature and high energy re-melting process to alter its chemical structure.

The invention further provides a glass binder that is capable of achieving high strength rapidly.

Still further yet, the invention provides a glass binder that is suitable for making a high strength mortar and concrete.

Additionally, the present invention provides a glass binder that is suitable for making artificial stone products using glass as a sole binder and aggregate. Further objects and advantages of the invention will become apparent from a consideration of ensuing description.

Furthermore, the present invention provides a glass binder composition, preferably a waste glass binder composition, having glass powder passes through at least one US standard sieve number 100 (opening size 0.15 mm), preferably passing through sieve number 200 (opening size 0.075 mm), an alkali activator selected from the group consisting of alkali metal hydroxides, alkali metal silicates, alkali metal aluminates, alkali metal carbonates, alkali metal sulfates, alkali metal phosphates, alkali metal fluorides, and the like, preferably alkali metal hydroxides, alkali metal silicates, and alkali metal aluminates, more preferably alkali metal silicates, wherein the alkali metal is selected from the group consisting of sodium, potassium, and lithium.

A preferred alkali activator in the preferred embodiment is sodium silicate that has a $SiO_2:Na_2O$ weight ratio of approximately between about 1.6:1 to about 2.0:1. The alkali activator is present in an amount of, by weight of waste glass powder, about 1% to 30%, preferably about 5% to 20%, more preferably about 5% to 10%. The glass binder may optionally contain about 0% to 10%, by weight of glass powder, such supplementary materials as calcium hydroxide and hardeners selected from a group consisting of sodium fluorosilicate, aluminum phosphate, and aluminum metaphosphate for certain desirable properties such as shortening curing time, reducing shrinkage, improving surface finish, and increasing strength. Mixed with water, the glass binders may be cured at ambient temperature for a time sufficient to yield desired strength or at an elevated temperature with or without steam to rapidly achieve high strength, wherein the temperature ranges from about 40° C. to about 120° C., and preferably between about 70° C. to about 90° C.

Further objects of the invention are obtained by providing waste glass binders suitable for making waste glass concrete and waste glass artificial stone wherein waste glass can act solely as aggregate and binder.

In this disclosure, "comprises", "comprising" and the like can have the meaning ascribed to them in U.S. Patent Law and can mean, "includes", "including" and the like.

These and other embodiments are disclosed or are obvious from and encompassed by, the following Detailed Description of the Invention.

DETAILED DESCRIPTION OF THE INVENTION

The present invention is based on a surprising finding that, while glass powder, preferably waste glass powder, does not harden on its own, it readily becomes self-binding with an addition of an alkali containing material. Thus, inorganic binders containing glass are thus provided by the invention. The present invention is further based on the finding that the glass binders, preferably waste glass binders, can rapidly achieve strikingly high strength when thermally cured at an elevated temperature. The present invention still further provides methods for making concrete, particularly for making artificial stone products by using glass, preferably waste glass, as a sole aggregate and/or binder.

In this disclosure, "pozzolanic" is the adjective of "pozzolans" and it refers to siliceous or aluminosiliceous materials that has little or no cementing property but it will, in a finely divided form and in the presence of moisture, react chemically with calcium hydroxide at an ambient temperature and/or room temperature to form compounds having cementing property. Granulated blast furnace slag and fly ash are examples of pozzolans or pozzolanic materials. The reaction between the glass powder (preferably, the waste glass powder) and calcium hydroxide in the presence of moisture is barely noticeable at an ambient temperature. Therefore, glass may be qualified as a latent pozzolanic material. The terms "self-binding", "cementing", "cementitious", and "hydraulic" in this disclosure refer to the property of such materials which harden with sufficient mechanical strength in the presence of moisture. Portland cement is an example of such cementitious material.

The inorganic waste glass binder in accordance of the present invention comprises waste glass powder and an alkali activator. Mixed with water, the waste glass binder can be cured at ambient temperature for a time sufficient to yield desired strength or at an elevated temperature with or without steam to rapidly achieve high strength.

The present invention is generally applicable to any type of glass however, due to the dire need of municipality worldwide to re-cycle glass that is not biodegradable, the present invention is more particularly directed at a method of re-using glass in an environmentally sound and friendly way that is useful and has a global application. Having said that, one can obtain waste glass from any post-consumer glass articles such as beverage bottles, window glass, and other glass containers. The general formula for glass is $Na_2O$—$CaO$—$SiO_2$, commonly known as a soda-lime-silicate glass. In this disclosure, waste glass includes, but is not limited to, soda-lime-silicate glass. Glasses other than soda-lime-silicate glass, for example, Pyrex glass and fused silica, are not required to be removed from waste glass. Waste glass according to the invention includes all colors, of which clear or flint, green, and amber are dominant. Mix-colored waste glass does not need to be sorted by color. However, some residues such as sugar syrup contained in the waste glass, which may adversely affect the setting and binding property, are preferred to be removed by cleaning or washing in advance.

Waste glass according to the present invention should be in a powder form. The grain of the powder should pass through US standard sieve number 100, preferably US standard sieve #200, whereby the opening sizes of sieve number 100 and number 200 are 0.15 mm and 0.075 mm, respectively. Waste glass powder can be generated by ball milling and pulverizing which are commonly known in the art.

The alkali activator according to the present invention is selected from the group consisting of alkali metal hydroxides, alkali metal silicates, alkali metal aluminates, alkali metal carbonates, alkali metal sulfates, alkali metal phosphates, alkali metal fluorides, and the like. Preferably, alkali metal hydroxides, alkali metal silicates, and alkali metal aluminates. More preferably, alkali metal silicates, wherein the alkali metal is selected from the group consisting of sodium, potassium, and lithium.

The alkali activator in accordance of the present invention can be either in the form of a solid powder or granule or in the form of an aqueous solution, depending on application, property desired, and the cost, one form may be preferred to the other.

Alkali activators of sodium are most preferable since they are cheap and readily accessible. However, potassium and lithium activators are also preferred for some desired properties. For example, potassium activators can be used to avoid efflorescence mainly associated with the carbonation of sodium salts. If Alkali-Silica Reaction is thus the primary concern when highly reactive aggregate is used in concrete, lithium activators are preferred.

Among all of the alkali activators, sodium silicate is found to be the most cost-effective in its application for the glass binder in accordance of the present invention. Sodium silicate, also known as water glass, is commonly used in building materials and is thus commercially available at a lower cost than those of other alkali activators. Sodium silicate comprises various amount of $SiO_2$ and $Na_2O$. It is important for sodium silicate to be readily soluble in water. Commercially available water glass has a weight ratio of $SiO_2$ to $Na_2O$ from about 1.60:1 to about 3.22:1. Preparation of sodium silicate at a lower ratio, as desired by some prior art mixtures, requires addition of sodium hydroxide. Although sodium silicate of a molar ratio lower than 1.60 is desired, it is not required to participate in the production of a glass binder in accordance with the present invention. Therefore, to avoid using sodium hydroxide, a costly and corrosive chemical, sodium silicate of a $SiO_2$ to $Na_2O$ ratio from about 1.6:1 to about 2.0:1 is preferred. Various solid and aqueous sodium silicates are available from PQ Corporation, Valley Forge, Pa.

The glass binder in accordance of the present invention has an alkali activator in an amount of, by weight of the waste glass powder, about 1% to 30%, preferably about 3% to 15%, more preferably about 3% to 10%, wherein all weights are calculated based on a solid mass. Expressing alkali activator dosage in terms of $Na_2O$ by weight of waste glass powder, good results are obtained by an alkali activator at a dosage of about 0.1% to 10% $Na_2O$, preferably of about 2% to 4% $Na_2O$.

Although not required, various supplementary materials can be included in the glass binder of the present invention to improve various properties. For example, additional calcium hydroxide is desirable to reduce shrinkage and to improve surface finishing and water resistance. Calcium hydroxide is added externally or derived from the hydration of Portland cement. Calcium hydroxide is present in an amount of about 0% to 15%, preferably 0% to 5%, by weight of waste glass powder. However, excessive calcium hydroxide can lead to great strength reduction. Furthermore, a hardener or a catalyst can be added to increase the strength of the glass binder in accordance of the present invention, in an amount of about 0% to 50%, preferably 0%–30%, by weight of the alkali activator used. Examples of hardeners for alkali metal silicates includes, but are not limited to fluoric and phosphoric materials selected from the group consisting of sodium silicofluoride, aluminum phosphate, aluminum metaphosphate, sodium phosphate, and the like.

The glass binder, in accordance with the present invention is curable when mixed with water at an ambient temperature. Water is added in an amount of about 20% to about 50% by total weight of the glass binder. However, the setting and hardening process is slow, compared to other binder systems such as Portland cement and alkali-activated slag binders. In some applications such as pre-cast concrete, rapid strength development is highly desirable. It has been shown that the inventive waste glass binder hardens rapidly upon mixing with water and yields very high strength when cured at an elevated temperature. In one example, the glass binder using sodium silicate as an alkali activator can achieve a strength of about 92.19 MPa after a twelve hour curing at about 80° C. and a strength of about 159.96 MPa after subsequently left in an ambient environment for about 2 years. The thermal curing may be performed with or without the presence of steam under normal or elevated pressures. Preferably, thermal curing of the glass binder in accordance of the present invention is performed under normal atmospheric pressure. Thermal curing can be performed by various means known in the art and is typically performed at temperature of about 40° C. to about 120° C., preferably about 70° C. to about 90° C., for a curing time sufficient to yield products with high strength. Curing time is typically about one hour to about sixty hours.

The present invention also provides a glass binder useful for making high strength mortar and concrete for various applications. The concrete composition according to the present invention generally contains, in addition to the inventive glass binder and water, aggregate, fibers, color pigments, polymer latexes, and chemical or mineral mixtures in an art-recognized amounts.

An aggregate for making concrete includes, but is not limited to, sand, natural and crushed quarried rock, glass, and the like, as well as mixtures thereof.

Short fibers are optionally added as a reinforcing material to enhance the flexural and impact resistance of concrete. Examples of suitable fibers include various natural and synthetic mineral fibers, such as carbon fibers, steel fibers, alkali-resistant glass fibers, and basalt fibers, and natural and synthetic organic fibers, such as propylene, vinylone, and cellulose fibers.

Polymer latexes can be used to impart elastomeric properties to the final composition. Suitable latexes include, but are not limited to, butadiene rubbers, styrene based polymers and copolymers, acrylic based polymers and copolymers, polyvinyl acetates, and the like.

In order to achieve an aesthetic end, desired color pigments in an amount of up to about 10% by weight of the glass binder can be added. Suitable pigments include, but are not limited to iron oxide, natural burnt amber, carbon black, chromium oxide, titanium dioxide, and the like.

The concrete mixture can also include chemical and mineral mixtures for imparting various desirable properties to concrete, including, but not limited to, water reducing admixtures, accelerating admixtures, pozzolans, such as fly ash, metakaolin, silica fume, and the like.

Although the hardening mechanism of concrete made with the glass binder in accordance with the present invention is not fully understood, one salient characteristic is that it does not contain any free portlanite (calcium hydroxide crystal), ettringite, or $C_3AH_6$, the conventional hydration products in Portland cement. These crystalline reaction products are liable to corrode carbonation and sulphatization which result in a significant deterioration in concrete. Thus, the inventive glass concrete exhibits many advantageous performances over conventional Portland cement concrete. Various advantages provided by the glass binder of the present invention includes better chemical durability and higher fire resistance characteristic. Furthermore, the threat of Alkali-Silica Reaction is greatly minimized when a reactive aggregate such as glass is used, due to the absence of free portlanite, even when the glass concrete according to the present invention contains a high level of alkalis. In certain instances where alkali-silica reaction is a big concern, lithium activator is preferred. Accordingly, the glass binder according to the present invention is highly suitable for making pre-cast concrete products. Among these products, glass artificial stone wherein glass is used as a sole aggregate and binder produces surprising and advantageous results.

The present invention further provides a process for making a glass artificial stone, comprising, preparing graded waste glass aggregate, preparing the glass binder in accordance with the present invention, applying a thin layer of silicone emulsion to the inner surface of a mold, mixing glass aggregate with the glass binder according to the present invention, water, and pigment, casting the fluid mixture into the mold; consolidating the fluid mixture by vibration and/or agitation, thermally curing the fluid mixture with the mold; and polishing the surface of the hardened mixture after releasing from the mold.

The glass aggregate used in the present invention is obtained by crushing glass articles or containers and/or any other articles and subsequently grading the glass particles by using a series of U.S. standard sieves ranging from number 4 (opening size of 4.76 mm) to number 100 (opening size of 0.075 mm). The color and grading of the glass aggregate are carefully coordinated to produce the desired aesthetic appearance. The glass aggregate is typically present in the mixture in an amount of about 0.5 to about 4 times the weight of the inventive glass binder. Water is also present in an amount sufficient to produce a consistent fluid concrete mixture that can be easily consolidated by vibration and/or agitation, preferably about 25% to about 50% by weight of the inventive glass binder.

Suitable superplasticizer are optionally used in the present invention to reduce water demand and viscosity. Suitable color pigment is typically used in an amount of 0% to about 10% by weight of the inventive glass binder.

Silicone emulsion is known to possess defoaming action and is present in many commercially available form release agents and defoaming agents. Two commercial products that contain silicone emulsion are CRETE-LEASE™, from Cresset Chemical Co., Weston, Ohio and GEO FM LTX from Geo Specialty Chemicals, Inc., Horsham, Pa. Although conventional defoaming agent is added in bulk to a mixture, applying a minimum amount of silicone emulsion to an inner surface of a mold produces a hardened glass concrete surface substantially free of visible surface air bubbles. Naturally, the addition of silicone emulsion and other defoaming agents in bulk to a mixture will further eliminate air bubbles in the hardened glass concrete.

The fluid mixture is cast in a mold and subsequently consolidated with a vibration table and/or a shaker and/or an agitator and/or other known external vibration means for a time sufficient to yield a consistent and bubble-free mixture, preferably about 0.5 min to 3 min. The consolidated mixture is thermally cured with the mold at an elevated temperature, preferably about 60° C. to about 90° C., for a time sufficient for the fluid mixture to harden and yield a minimum strength of about 2,000 psi (13.79 MPa), preferably about two to about twenty-four hours.

After releasing from the mold, the hardened mixture is subjected to a polishing treatment. Commonly known method of polishing means can be used. The hardened surface is subsequently polished with a series of grinding grits until shiny and translucent to reveal the glass particles.

The resultant product, an artificial glass stone, exhibits a stunning visual appearance that strongly resembles natural marble, sandstone, slate, basalt, alabaster, jade and granite yet not commonly found in nature. The artificial glass stone can be formed into any shapes or forms depending on it final applications, such as floor and wall covering tiles, countertop tables, and the like. In addition to providing an alternative solution to waste glass, the present invention also provides a maximum use of these recycled waste material, i.e. by using them to make artificial glass stone that are environmentally friendly and affordable. Furthermore, with comparable aesthetics and performance, the inventive artificial glass stone also offers many advantageous characteristics over natural stone. For example, the strength of the inventive artificial glass stone continues to increase over the time, contrary to the characteristics of the natural stone. Additionally, the inventive artificial glass stone is highly moldable, offering great versatility for engineering and artistically designing the final products.

The invention shall be further described by way of the following non-limiting examples that are also an illustration of the invention and are not to be considered a limitation of this invention, many apparent variations of which are possible without departing from the spirit or scope of the present invention.

A better understanding of the present invention and of its many advantages will be seen from the following non-limiting examples, given by way of illustration.

EXAMPLES

Example 1

Glass Binder Composition Comprising Sodium Silicate as Alkali Activator

A glass binder composition comprising sodium silicate is formed according to Table 1.

TABLE 1

| Component | Amount |
|---|---|
| Glass powder[1] | 100 parts |
| Sodium silicate[2] | 8.53 parts |

[1]Clean glass powder is obtained by passing these glass powder through U.S. standard sieve number 200, prepared by grinding crushed SNAPPLE ™ beverage bottles.
[2]Sodium silicate having a $SiO_2$: $Na_2O$ weight ratio of 1.636 is added. This sodium silicate is commercially-available as a Type B-W ™ 50 sodium silicate solution having a solid content of 42.63% from PQ Corporation, Valley Forge, PA. Sodium silicate used in the present invention is calculated on a solid basis and contains 3.23% $Na_2O$ by weight of glass powder.

Glass binder composition in accordance with the present invention is mixed with additional water to form a glass binder paste. The binder paste is further cast into a mold and subsequently cured under different conditions to yield desired strength.

If cured at ambient temperature, the strength development of the binder paste is usually slow. However, if cured at an elevated temperature, the binder paste hardens rapidly and achieves a very high strength within a few hours. In a representative embodiment of the invention, for example, two samples of glass binder were made according to Table 1 with 29.30 parts of water. Both samples were cured at 80° C. without steam for approximately twelve hours. The first sample was tested immediately after curing was completed and yielded a compressive strength of 13.37 ksi (92.19 MPa). The second sample was left in an ambient environment and tested for strength after about two years from the time the sample was made. The compressive strength was as high as only 23.20 ksi (159.96 MPa).

The above comparison shows that the glass binder of the present invention is capable of achieving a very high strength within a relatively short period of time if proper alkali activator and thermal treatment is given. Such strength can be much higher than that of a conventional Portland cement binder and is indeed comparable to that of granite, the hardest natural stone. Furthermore, the inventive glass binder is capable of developing its strength continuously over time which is contrary to the nature of the natural stone.

In comparison with Silverstrim, it is surprisingly found that a low weight ratio between $SiO_2$ and $Na_2O$, about 0.20:1 to about 0.75:1, is not needed to activate glass, thus avoiding the use of additional component such as NaOH which is costly and corrosive. This offers the inventive glass binder additional advantages for simplifying manufacturing process and reducing the cost of raw material. Furthermore, it is shown that the inventive glass binder yields higher strength than the known binder systems under the same curing condition.

Example 2

Comparative Examples Demonstrating Effect of Curing Conditions

Samples were prepared according to the composition described in Table 1 in Example 1 with an addition of 36.90 parts of water. However, the glass powder used in this example is green glass and its granular size can pass through U.S. standard sieve number 200 obtained by grinding crushed HEINEKEN™ beer bottles. The samples were cured under various conditions and tested for strength after the curing was completed. The results are shown in Table 2.

TABLE 2

| Sample # | Curing Condition | Compressive Strength[1] |
|---|---|---|
| 1 | Ambient temperature (25° C.) for 7 days | 0.39 ksi (2.70 MPa) |
| 2 | Ambient temperature (25° C.) for 28 days | 6.39 ksi (44.03 MPa) |
| 3 | 80° C. without steam for 8 hours | 5.09 ksi (35.09 MPa) |
| 4 | 80° C. with steam for 8 hours | 5.71 ksi (39.35 MPa) |

[1]The test specimen is a cylinder with a diameter of 1 inch and a height of 1 inch.

As indicated in sample 1, the inventive glass binder develops its strength at a rate much lower than that of conventional Portland cement binder or an alkali-activated slag binder. However, a period of time, for example at the 28th day, which is the normal time for conventional Portland cement binder to develop its full strength, the inventive glass is able to achieve a very high strength even under normal ambient conditions, as shown by sample 2. The results of sample 3 and sample 4 demonstrate that the curing time for achieving a high strength is greatly reduced if the inventive glass binder is cured at an elevated temperature in the presence or absence of the steam. This characteristic is especially advantageous for pre-cast applications where increasing production rate is highly desired.

Example 3

Glass Binder Composition Further Comprising Supplementary Materials

Samples were prepared according to the composition similar to Table 1 of Example 1 except that the binder composition further comprises various supplementary materials as described in Table 3.

Sample 5 is similar to sample 1 with the exception that the aluminum phosphate is added as a hardener in an amount of about 20% by weight of sodium silicate. It is shown that the aluminum phosphate is also an effective hardener capable of increasing the strength of the inventive glass binder containing sodium silicate.

Example 4

Glass Binder Composition Comprising Sodium Hydroxide as Alkali Activator

A glass binder composition comprising sodium hydroxide is formed according to the contents listed in Table 4, along with curing conditions and compressive strengths.

TABLE 3

| Sample Number | Glass powder[1] | Sodium silicate[2] | Calcium hydroxide[3] | Sodium silico-fluride[4] | Aluminum phosphate[5] | Water | Curing condition | Compressive strength |
|---|---|---|---|---|---|---|---|---|
| 1 | 100 parts | 8.53 parts | | | | 36.90 parts | Ambient temperature for 28 days | 6.39 ksi (44.03 MPa) |
| 2 | 100 parts | 8.53 parts | | | | 36.90 parts | 80° C. with steam for 8 hours | 5.71 ksi (39.35 MPa) |
| 3 | 100 parts | 8.53 parts | 5.00 parts | | | 39.62 parts | 80° C. with steam for 8 hours | 3.72 ksi (25.59 MPa) |
| 4 | 100 parts | 8.53 parts | | 1.71 parts | | 37.48 parts | Ambient temperature for 28 days | 7.98 ksi (55.04 MPa) |
| 5 | 100 parts | 8.53 parts | | | 1.71 parts | 37.48 parts | Ambient temperature for 28 days | 7.76 ksi (53.53 MPa) |

[1]Glass powder is green glass passing through U.S. standard sieve number 200, prepared by grinding crushed HEINEKEN ™. beer bottles.
[2]Sodium silicate having a $SiO_2:Na_2O$ weight ratio of 1.636, available as Type B-W. ™50 sodium silicate solution with a solid content of 42.63% is used. The Sodium silicate is commercially available from PQ Corporation, Valley Forge, PA and it is calculated on a solid basis and contains 3.23% $Na_2O$ by weight of waste glass powder.
[3]Calcium hydroxide having a formula of $Ca(OH)_2$ is used. The calcium hydroxide is commercially available in a powder form Whittacker, Clark & Daniels, Inc., South Plainfield, NJ.
[4]Sodium silicofluoride having a formula $Na_2SiF_6$ is used. The sodium silicofluoride is commercially available in a powder form from Seal Chemical Industries, Newport Beach, CA.
[5]Aluminum phosphate having a formula $Al(H_2PO_4)_3$ is used. The aluminum phosphate is commercially available as an aqueous solution with a solid content of 50% from Rhodia Phospate Products, Cranbury, NJ.

Samples 1 and 2 are the same as samples 2 and 4 of Example 2, respectively and are included for comparative purpose.

Sample 3 is similar to sample 2 except that 5% calcium hydroxide by weight of glass powder is added. After curing, the resultant sample exhibits a superior fine surface finish. However, this sample came with a reduction in strength.

Sample 4 is similar to sample 1 except that sodium silicofluoride is added as a hardener in an amount of about 20% by weight of sodium silicate. It is shown that silicofluoride is an effective hardener agent capable of increasing the strength of the inventive glass binder containing sodium silicate.

TABLE 4

| Sample Number | Glass powder[1] | Sodium hydroxide[2]. | Water | Curing condition | Compressive strength |
|---|---|---|---|---|---|
| 1 | 100 parts | 4.17 parts[2] | 35.42 parts | Ambient temperature for 7 days | 0.30 ksi (2.07 MPa) |
| 2 | 100 parts | 4.17 parts[2] | 35.42 parts | Ambient temperature for 28 days | 5.79 ksi (39.92 MPa) |
| 3 | 100 parts | 4.17 parts | 35.42 parts | 80° C. without steam for 8 hours | 8.68 ksi (59.85 MPa) |

TABLE 4-continued

| Sample Number | Glass powder[1] | Sodium hydroxide[2] | Water | Curing condition | Compressive strength |
|---|---|---|---|---|---|
| 5 | 100 parts | 4.17 parts | 35.42 parts | 80° C. with steam for 8 hours | 6.15 ksi (42.40 MPa) |

[1]Glass powder used is a green glass granule passing through U.S. standard sieve number 200, prepared by grinding crushed HEINEKEN ™ beer bottles.
[2]Sodium hydroxide used is commercially available as granule from Aldrich Chemical Company, Milwaukee, WI. Sodium hydroxide added contains 3.23% $Na_2O$ by weight of glass powder, the same as used in Example 1.

Example 5

Glass Binder Composition Comprising Sodium Aluminate as an Alkali Activator

Glass binder compositions comprising sodium aluminate are formed according to Table 5, along with curing conditions and compressive strengths.

TABLE 5

| Sample Number | Glass powder | Sodium aluminate[3] | Calcium hydroxide[4] | Water | Curing condition | Compressive strength |
|---|---|---|---|---|---|---|
| 1 | 100 parts[1] | 6.67 parts | | 36.26 parts | 80° C. without steam for 8 hours | 4.39 ksi (30.27 MPa) |
| 2 | 100 parts[1] | 10.00 parts | | 37.4 parts | 80° C. without steam for 8 hours | 4.63 ksi (31.92 MPa) |
| 3 | 100 parts[2] | 5.00 parts | 5.00 parts | 38.5 parts | 80° C. with steam for 8 hours | 3.99 ksi (27.52 MPa) |

[1]Glass powder used in this experiment is green glass with a granule size capable of passing through U.S. standard sieve number 200, prepared by grinding crushed HEINEKEN ™. beer bottles.
[2]Glass powder used is green glass with a granule size capable of passing through U.S. standard sieve number 400, prepared by grinding crushed HEINEKEN ™ beer bottles.
[3]Sodium aluminate having a $Al_2O_3:Na_2O$ weight ratio of 1.087 is used. The sodium aluminate is commercially available as an aqueous solution with a solid content of 38.4% from Delta Chemical Corporation, Baltimore, MD. The added sodium aluminate is calculated on a solid basis and contains 3.23% in sample 1, 4.84% in sample 2, and 2.42% in sample 3, respectively, of $Na_2O$ by weight of glass powder.
[4]Calcium hydroxide having a formula of $Ca(OH)_2$ is used. The Calcium hydroxide is commercially available in a powder form from Whittacker, Clark & Daniels, Inc., South Plainfield, NJ.

Example 6

Artificial Stone Comprising Glass Solely as Aggregate and Binder

An artificial stone composition was prepared according to Table 6-1.

TABLE 6-1

| Components | Amount |
|---|---|
| Glass powder[1] | 100 parts |
| Sodium silicate[2] | 8.53 parts |

TABLE 6-1-continued

| Components | Amount |
|---|---|
| Glass aggregate[3] | 244.19 parts |
| Pigment[4] | 2.00 parts |
| Water | 35.82 parts |

[1]Glass powder used is clear glass having a granule size capable of passing through U.S. standard sieve number 200. This glass powder is prepared by grinding crushed SNAPPLE ™ beverage bottles.
[2]Sodium silicate having a $SiO_2:Na_2O$ weight ratio of 1.636 is used. The sodium silicate is commercially available as Type B-W ™ 50 sodium silicate solution with a solid content of 42.63% commercially available from PQ Corporation, Valley Forge, PA. The added sodium silicate is calculated on a solid basis and contains 3.23% $Na_2O$ by weight of glass powder.
[3]Clear and green glass aggregate are used. These glasses are obtained by crushing and grading SNAPPLE ™ beverage bottles and HEINEKEN ™ beer bottles, respectively. The color and grading of this glass aggregate are described in Table 6-2.
[4]Pigment used is chromium oxide which is commercially available as Rainbow Cement Colors from Empire Blended Products Inc., Bayville, NY.

TABLE 6-2

| U.S. Standard Sieve | Weight Percentage of Individual Fraction Retained | Color of Glass Aggregate |
|---|---|---|
| #4 | 15 | Clear |
| #8 | 25 | Green |
| #16 | 20 | Clear |
| #30 | 15 | Clear |
| #50 | 15 | Clear |
| #100 | 10 | Clear |
| Total | 100 | |

The composition was mixed and cast into a mold whose inner surface was prepped with a thin layer of GEO FM LTX, available from Geo Specialty Chemicals, Inc., Horsham, Pa. The composition was consolidated with the mold on a vibration table for about two minutes and then cured in an oven at 80° C. for eight hours. Upon de-molding, the hardened product exhibited a flat surface which was subsequently polished by a hand polisher with a series of diamond grids to reveal shiny and translucent glass aggregate particles. By artistically coordinating the color and grading of glass aggregate as well as the color pigment, the final product strongly resembles natural marble, sandstone, slate, basalt, alabaster, jade or granite with a distinct visual appearance. The strength of the inventive artificial stone is comparable to that of natural granite, but increases with time. Such an artificial stone contains up to 98% glass aggregate and is highly environmental-friendly.

What is claimed is:

1. A water-curable and high-strength binder composition, comprising a glass powder and an alkali activator selected from the group consisting of alkali metal hydroxide, alkali metal silicate, alkali metal aluminate, alkali metal carbonate, alkali metal sulfate, alkali metal phosphate and alkali metal fluoride, wherein the amount of alkali activator is about at most 20% by weight of the glass powder.

2. The binder composition as claimed in claim 1, wherein the glass powder has a particle size of less than 0.15 mm.

3. The binder composition as claimed in claim 1, wherein the alkali activator is selected from the group consisting of alkali metal hydroxide, alkali metal silicate, and alkali metal aluminate.

4. The binder composition as claimed in claim 1, wherein the alkali metal in the alkali activator is selected from the group consisting of sodium, potassium, and lithium.

5. The binder composition as claimed in claim 1, wherein the glass powder is a soda-lime glass and has a particle size of about less than 0.075 mm.

6. The binder composition as claimed in claim 1, wherein the alkali activator is alkali metal silicate.

7. The binder composition as claimed in claim 5, wherein the alkali activator is sodium silicate and has a weight ratio of about 0.5:1 to about 3.22:1 between $SiO_2$: $Na_2O$ and present in an amount of about 3% to about 15% by weight of the glass powder.

8. The binder composition as claimed in claim 5, wherein the alkali activator is sodium silicate and has a weight ratio of about 1.6:1 to about 2.0:1 between $SiO_2$:$Na_2O$ and is present in an amount of about 4% to about 10% by weight of the glass powder.

9. The binder composition as claimed in claim 1, further comprising a hardener selected from the group consisting of sodium silicofluoride, aluminum phosphate, and aluminum metaphosphate in an amount of about 0% to about 50% by weight of the alkali activator.

10. The binder composition as claimed in claim 1, wherein the alkali activator further comprises calcium hydroxide in an amount of about 0% to about 10% by weight of the glass powder.

11. The binder composition as claimed in claim 1, further comprising Portland cement in an amount of about 0% to about 15% by weight of the glass powder.

12. The binder composition as claimed in claim 1, wherein the alkali activator is an alkali metal hydroxide present in an amount of about 3% to about 15% by weight of glass powder.

13. The binder composition as claimed in claim 1, wherein the alkali activator is an alkali metal aluminate present in an amount of about 3% to about 15% by weight of glass powder.

14. The binder composition as claimed in claim 1, further comprising a glass aggregate in an amount of about 0.5 to about 4 times by the total weight of the glass powder and the alkali activator.

15. A method of making a high strength hardened composition comprising:
(a) forming a binder composition by mixing a glass powder and an alkali activator selected from the group consisting of alkali metal hydroxide, alkali metal silicate, alkali metal aluminate, alkali metal carbonate, alkali metal sulfate, alkali metal phosphate and alkali metal fluoride, wherein the alkali activator is present in an amount of about 1% to about 20% by weight of the glass powder;
(b) admixing the binder composition with water in an amount of about 25% to about 50% by weight of the binder composition to obtain a plastic mixture; and
(c) curing the mixture at a temperature of about 0° C. to about 120° C. for a time sufficient for the mixture to yield a compressive strength of at least about 2,000 psi (about 13.79 MPa).

16. The method as claimed in claim 15, wherein the curing temperature is about 40° C. to about 100° C.

17. The method as claimed in claim 15, wherein the curing time is about one hour to about sixty hours.

18. The method as claimed in claim 16, wherein the curing time is about one hour to about twenty-four hours.

19. The method as claimed in claim 15, wherein the curing temperature is about 70° C. to about 90° C.

20. A composition for making an artificial stone comprising:
(a) a binder composition having a glass powder with a particle size of less than about 0.15 mm and an alkali activator selected from the group consisting of alkali metal hydroxide, alkali metal silicate, alkali metal aluminate, alkali metal carbonate, alkali metal sulfate, alkali metal phosphate and alkali metal fluoride and present in an amount of about 1% to about 20% by weight of the glass powder;
(b) a glass aggregate having a graded particle size of between about 9.52 mm to about 0.15 mm and present in an amount of about 0.5 times to about 3.5 times by weight of the binder composition;
(c) water in an amount of about 25% to about 50% by weight of the binder composition; and
(d) at least one color pigment in an amount of about 0% to about 10% by weight of the binder composition.

21. A method of making an artificial stone composition comprising:
(a) forming a mixture comprising
(1) a binder composition which comprises a glass powder having a particle size of less than about 0.15 mm and an alkali activator selected from the group consisting of alkali metal hydroxide, alkali metal silicate, alkali metal aluminate, alkali metal carbonate, alkali metal sulfate, alkali metal phosphate and alkali metal fluoride and present in an amount of about at most 20% by weight of the glass powder,
(2) a glass aggregate having a graded particle size of between about 4.76 mm to about 0.15 mm and present in an amount of about 0.5 times to about 4 times by weight of the binder composition,
(3) water in an amount of about 25% to about 50% by weight of the binder composition, and
(4) at least one color pigment in an amount of about 0% to about 10% by weight of the binder composition;
(b) preparing a mold having an inner surface;
(c) applying a thin layer of a liquid selected from the group consisting of a form releasing agent and a defoaming agent to the inner surface of the mold;
(d) casting the mixture into the mold and consolidating the mixture;
(e) curing the mixture at an elevated temperature for a time sufficient to form a hardened mixture with a compressive strength of at least 2,000 psi (13.79 MPa);
(f) releasing the hardened mixture from the mold; and
(g) polishing the hardened mixture.

22. The method as claimed in claim 21, wherein the liquid is a silicone based emulsion.

23. A concrete composition comprising:
a binder composition having a glass powder and an alkali activator selected from the group consisting of alkali metal hydroxide, alkali metal silicate, alkali metal aluminate, alkali metal carbonate, alkali metal sulfate, alkali metal phosphate, and alkali metal fluoride and present in an amount of about 1% to about 20% by weight of the glass powder, and
a glass aggregate in an amount of about 0.5 times to about 4 times by weight of the binder composition.

24. The concrete composition as claimed in claim 23, further comprising at least one supplementary material selected from the group consisting of fibers, color pigments, polymer latexes, plasticizers defoaming agents and mineral admixtures in an amount of up to about 10% by weight of the binder composition.

25. An artificial stone or concrete composition formed from a mixture comprising:
(1) a binder composition which comprises a glass powder having a particle size of less than about 0.15 mm and an alkali activator selected from the group consisting of alkali metal hydroxide, alkali metal silicate, alkali metal aluminate, alkali metal carbonate, alkali metal sulfate, alkali metal phosphate and alkali metal fluoride and present in an amount of about at most 20% by weight of the glass powder;

(2) a glass aggregate having a graded particle size of between about 4.76 mm to about 0.15 mm and present in an amount of about 0.5 times to about 4 times by weight of the binder composition;

(3) water in an amount of about 25% to about 50% by weight of the binder composition; and (4) at least one color pigment in an amount of about 0% to about 10% by weight of the binder composition;

wherein the composition has a compressive strength of at least 2,000 psi (13.79 Mpa).

* * * * *